United States Patent [19]
Handley

[11] Patent Number: 6,141,464
[45] Date of Patent: Oct. 31, 2000

[54] ROBUST METHOD FOR FINDING REGISTRATION MARKER POSITIONS

[75] Inventor: John C. Handley, Fairport, N.Y.

[73] Assignee: Xerox Corporation, Stamford, Conn.

[21] Appl. No.: 09/050,213

[22] Filed: Mar. 30, 1998

[51] Int. Cl.⁷ .................................................. G06K 9/36
[52] U.S. Cl. ........................................................ 382/287
[58] Field of Search .................................... 382/112, 192, 382/193, 194, 197, 286, 287, 291

[56] References Cited

U.S. PATENT DOCUMENTS

| | | | |
|---|---|---|---|
| 4,153,897 | 5/1979 | Yasuda et al. | 340/146.3 Q |
| 4,989,257 | 1/1991 | Horowitz | 382/18 |
| 5,054,094 | 10/1991 | Barski | 382/18 |
| 5,198,907 | 3/1993 | Walker et al. | 358/296 |
| 5,216,724 | 6/1993 | Suzuki et al. | 382/7 |
| 5,267,328 | 11/1993 | Gouge | 382/16 |
| 5,291,243 | 3/1994 | Heckman et al. | 355/201 |
| 5,642,202 | 6/1997 | Williams et al. | 358/406 |
| 5,870,494 | 2/1999 | Kanda et al. | 382/197 |

OTHER PUBLICATIONS

Pal et al., "A review of image segmentation techniques," *Pattern Recognition*, vol. 26, No. 9, pp. 1277–1294, 1993.

*Primary Examiner*—Andrew W. Johns

[57] ABSTRACT

A method and system for detecting registration markers having the shape of an 'X' on a scanned test target used to calibrate an image processing system. The procedure is impervious to scanning and printing distortion. A captured image is converted to a binary image and then segmented into a list of eight-connected components. A set of features is extracted from each component in the list. An accurate decision rule is executed on each component. If a component is found to be a marker, its centroid is returned as its position.

13 Claims, 5 Drawing Sheets

ROBUST METHOD FOR FINDING REGISTRATION MARKER POSITIONS

FIELD OF THE INVENTION

The present invention is related to image processing and pattern recognition and, more particularly, to accessing the image quality produced by an electronic scanning device by using test targets containing special image patterns.

BACKGROUND OF THE INVENTION

Image quality assessment and adjustment is often done in an image processing system (such as a photocopier, electronic scanner, digital camera, or video camera) by capturing the image of a test target with known physical attributes. The measured attributes are compared to the physical measurements to provide a characterization of the system. For example, a sequence of gray patches, increasing from light to dark (called a step-wedge) can be produced with known darknesses (optical densities) by measuring the ratio of impinging light to the amount of reflected light under controlled conditions. The step-wedge is then captured with an electronic imaging device so that the image is represented as an array of pixel values. Each patch represents a different optical density and maps to a "digital count" in the imaging device. A mapping can thus be inferred from true optical density to digital counts in the electronic device. This mapping, called a tone reproduction curve (TRC), is a calibration of the device. With the TRC, one may use the electronic device as a measurement instrument, or use the TRC to correct defects in the tone of subsequent images captured using the device. An automatic means of detecting the location of patches in the array of pixels in electronic device (or computer memory) is needed to conveniently compute the mapping.

One method is to put distinguishing markers in the corners of the test target and measure the positions of the patches relative to the markers. A calibration program as executed by a central processing unit would analyze the array to detect the markers. By knowing the physical distance among the markers and computing the distance between the detected markers in the image, a scale factor can be computed which allows the positions of the patches in the array to be computed.

Automatic calibration is desirable in a commercial product where the naïve user is relieved of the task of calibration. Indeed, a set of instructions can be provided to the user to image a test target and press a button and then continue with image capture.

In a document scanning scenario, good image quality is achieved by characterizing many aspects of the device, including its inherent resolution (smallest image features that can be preserved through the system). Systematic or random distortions may be introduced by the scanner. Proper characterizations of these distortions allows compensation for these distortions via image processing algorithms executed in hardware or software. There often are image processing functions used by the device to increase image quality when printed. For example, a scanned document may be "halftoned" to represent gray by a cluster of black dots. The arrangement of black dots, carefully-crafted to represent gray unobtrusively to the human visual system, may be ruined by scanning and printing. To compensate for this after scanning, image processing algorithms, modeling the human visual system, estimate the gray that a human was intended to perceive. Printing the gray produces significantly better reproduction. To test the quality of this reproduction, the entire test target is rendered, printed in halftones and scanned in. Measurements from original patches are compared with scanned halftoned patches. To make this process automatic for a naive user, the registration markers must be detected even though they have suffered serious degradation through scanning, halftoning, printing and rescanning.

Many other measurements are possible depending on the imaging system. FIG. 2 shows an example of a test target. There are numerous patches to measure many characteristics of the imaging system. The two markers at the top are to be detected. Calibration algorithms use the detected positions to then compute the positions of the patches in the image array. The same test target may be scanned in a plurality of resolutions, including anisotropic aspect ratios (e.g. 400 by 600 dots per inch), as well as being subject to extreme distortions by the imaging system. Thus an algorithm to detect the markers must be robust against these distortions (halftoning, low contrast, etc). The present invention is designed and proven to be robust against a variety of distortions.

U.S. Pat. No. 5,198,907 provides a means for target registration using an inverted 'L'-shaped figure, called "guide bars". Guide bars are detected using edge detection and following. The algorithm starts at the upper left corner and uses differences in "exposure" to detect the edge. It then follows edges to find bars with the correct width and height. The guide bars are long relative to the captured area and in horizontal and vertical directions. The dimensions (lengths and widths) must be known beforehand to allow detection. These constraints preclude marker identification under the extreme distortions this invention overcomes.

U.S. Pat. No. 5,642,202 provides a means for calibrating a printer. Using registration marks, the original and scanned, printed version can be registered and compared to generate calibration data. Registration marks are three collinear triangles having designated non-collinear "apexes" at known positions which are used to compute the registration transformation from the scanned image to the original. These triangles are detected using black-to-white and white-to-black transitions along horizontal scans. This method is not robust to halftoning (dithering or error diffusion) nor can there can be any image content or noise between the triangles because the algorithm looks for exactly 6 transitions. Nor can there be large amounts of document skew that would make it impossible to find the six transitions.

Other pattern detection methods are presented by the following patents:

U.S. Pat. No. 4,153,897 Yasuda, et. al.

Issued May 8, 1979 U.S. Pat. No. 5,216,724 Suzuki, et. al.

Issued June 1, 1993 U.S. Pat. No. 5,291,243 Heckman, et. al.

Issued March 1, 1994

Yasuda et al. discloses a pattern recognition system where similarities between unknown and standard patterns are identified. Similarities are detected at first in respective shifting conditions where the unknown and standard patterns are relatively shifted from each other over the first limited extent, including the condition without shift. The maximum value of these similarities is then detected. The similarities are further detected in respective shifting conditions where the unknown and standard patterns are relatively shifted from each other over the second extent larger than the first limited extent, when the shifting condition which gave the maximum value is that without relative shift.

Suzuki et al. discloses an apparatus for image reading or processing that can precisely identify a particular pattern, such as bank notes or securities. A detecting unit detects positional information of an original image and a discriminating unit extracts pattern data from a certain part of the original image to discriminate whether the original image is the predetermined image based on the similarity between the pattern data and the predetermined pattern.

Heckman et al. discloses a system for printing security documents which have copy detection or tamper resistance in plural colors with a single pass electronic printer. A validating signature has two intermixed color halftone patterns with halftone density gradients varying across the signature in opposite directions, but different from the background.

A publication by Pal et al. entitled "A review of image segmentation techniques," Pattern Recognition, Vol 26, No 9, p 1277–1294 (1993) also discloses several image segmentation techniques.

All of the references cited herein are incorporated by reference for their teachings.

SUMMARY OF THE INVENTION

When the test target is captured, it is represented as a gray-scale image in device or computer memory where each picture element (pixel) is represented by a value between 0 and 255, inclusive, stored in a byte. We assume that black is represented by 0 and white is represented by 255. This assumption is not necessary for the invention, but simplifies this exposition. Where the image not so represented, means well-known in the prior art could be used to convert it to this representation. The first step is to threshold the image using a value T to produce a binary representation by assigning those pixels with a value less than T the value 0 and those grater than or equal to T, the value 1. Of the 256 levels of gray, there are 254 possible threshold values (the other two values produce all 0's or all 1's). Some of these threshold values produce better binary images for marker detection than others, but without prior knowledge of the image, we make an initial guess that a good threshold is T=128. This guess is not necessary to the invention, but is merely a means for speedy processing.

The next step is to determine the eight-connected components in the binary image. The markers will be among these. Finding eight-connected components in a binary image is well-known in the prior art. The preferred embodiment converts the binary image to a runlength representation, builds a line adjacency graph, and then finds connected components in this graph [T. Pavildis, *Algorithms for Graphics and Image Processing,* 1981, Computer Science Press, Rockville, Md.].

From a list of connected components, each is inspected to determine whether or not it is a marker or not. The key is to extract features that accurately describe an 'X' marker invariant under a variety of distortions, but in such a way that no other "non-X" component is mistaken for an 'X'. If two markers are not found, the original image undergoes a histogram equalization process well-known in the art [Gonzales and Woods, Digital Image Processing, Addison-Wesley, 1992] and the threshold for binarization is set at T=64. This value works well on our particular image processing systems, but can be adjusted depending on the application. Indeed, one may apply any number of binarization techniques known in the prior art, including adaptive ones [N. R. Pal and S. K. Pal, "A review of image segmentation techniques," *Pattern Recognition,* Vol. 26, No. 9, pp. 1277–1294, 1993].

When the two markers are found, the centroid of the markers are reported to the calibration process, which has stored the positions of the patches relative to these markers.

Other advantages and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

The identification method in a scanner production environment, where testing must be done quickly and reliably for each machine, is the subject of this invention.

Figure 1:
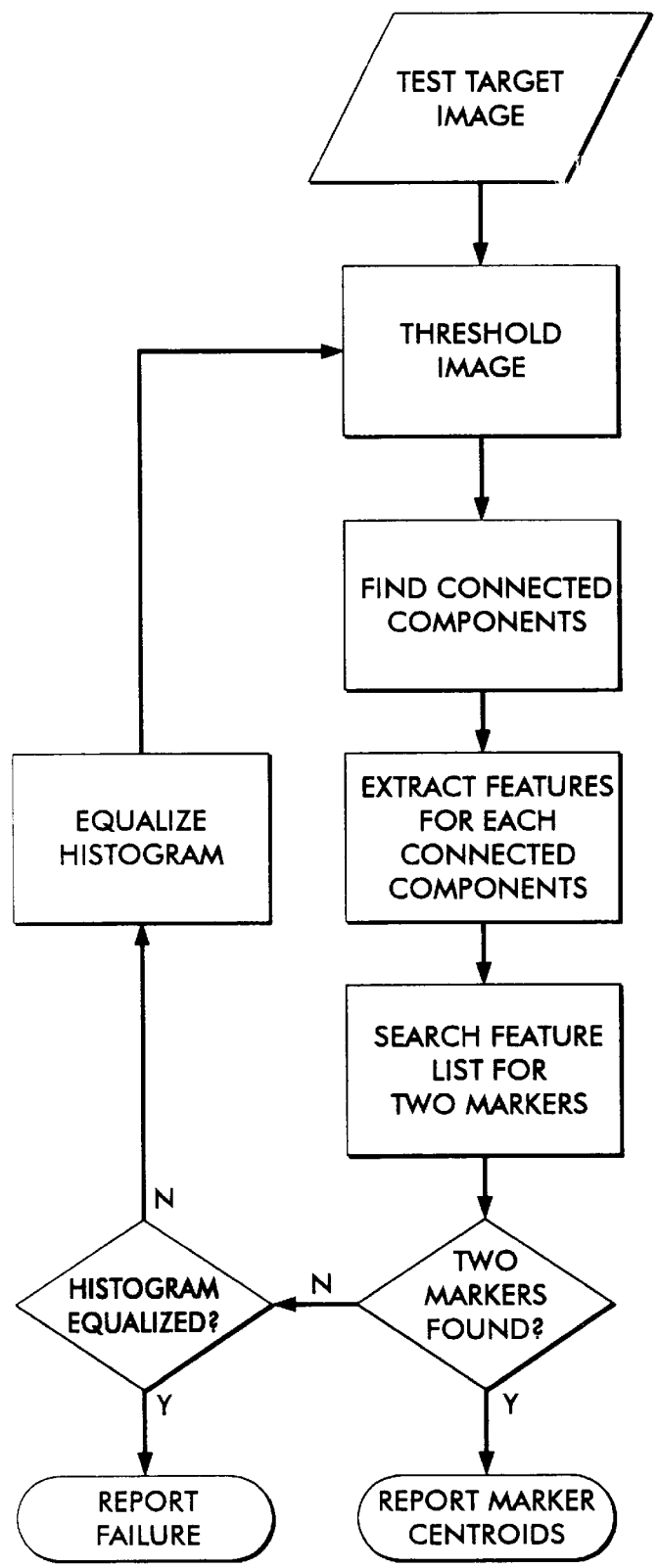
FIG. 1 shows a flowchart of the marker detection process.
Figure 2:
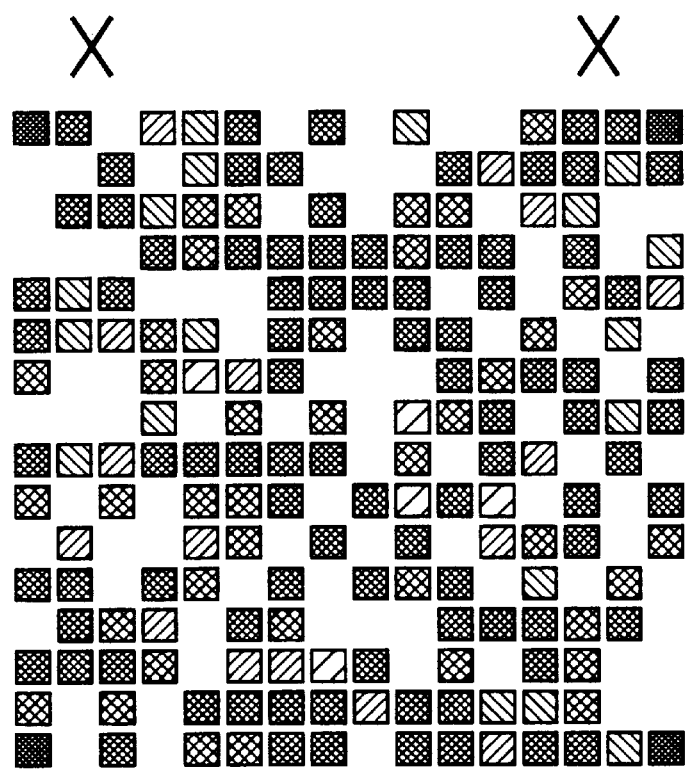
FIG. 2 shows a typical test target. The 'X's' in the upper left and upper right corners are the registration markers. Below them is an array of patches, that, when processed by an image processing system, provide measurement and calibration information.
Figure 3:
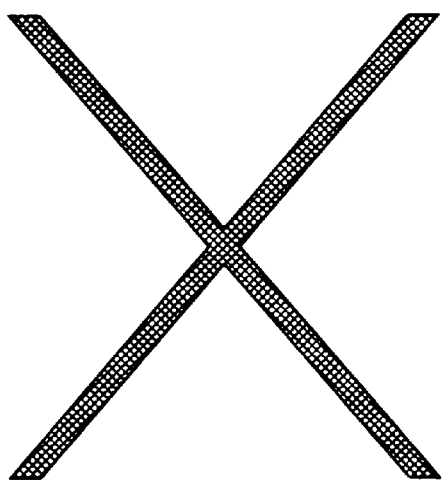
FIG. 3 shows a close-up of an 'X' marker.
Figure 4:
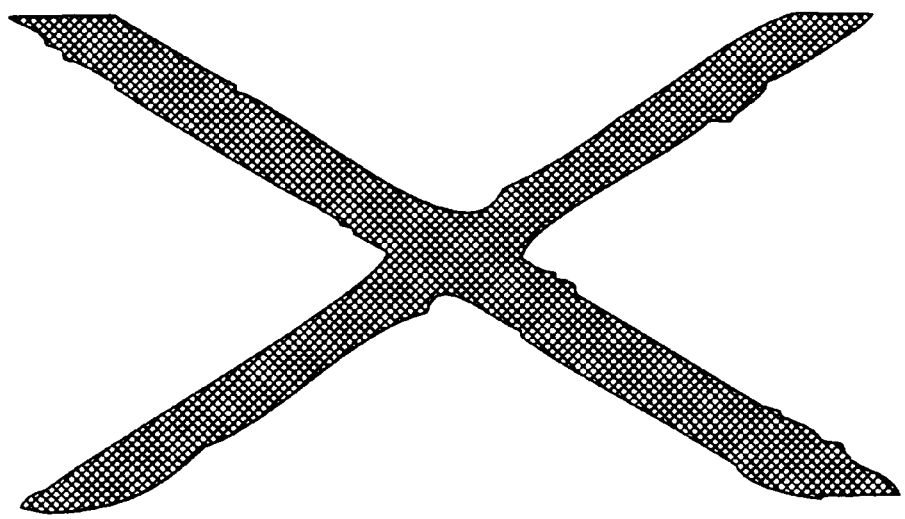
FIG. 4 shows an 'X' marker subjected to an anisotropic distortion.

A test target image such as the one in FIG. 2 is captured as a raster scan comprised by an array of values in computer memory where each of which is a value between 0 and 255. The value 0 represents black, or minimum reflectance, and 255 represents white, or maximum reflectance. The image may be obtained by any electronic capture device, typically, but not limited to a document scanner, an electronic (digital) still image camera, or video camera. Although the current embodiment processes gray scale images as just described, any image representation amenable to binary representation can also be processed. All that is required is that the shapes of the symbols in the image be represented in a binary way. For example, if the image is a color image with each pixel represented as a triplet of red, green, and blue reflectances, procedures known in the prior art can be used to convert the color image to an "intensity" image. Or any one or all of the red, green, and blue channels can be processed. The marker need not be black on white, but must have a spectral reflectance that is distinguishable from the spectral reflectance of the background.

Once captured and stored as above, the image is thresholded. In the preferred embodiment a value of T=128 is used to distinguish between the marker and background spectral reflectances by means of a simple intensity decision. If the pixel value is great than or equal to T, the pixel value is labeled white and black otherwise. The resulting binary image captures the essential shape of the marker (and content in the image). As noted above, black and white serve as labels to distinguish the marker from the back ground based upon some decision procedure, whether it be a simply threshold, a sophisticated adaptive binarization algorithm or analysis of the spectral reflectances of the image.

The next step is to convert the binary image into 8-connected contiguous regions of black. These regions are called connected components and efficient methods for finding them are well-known in the prior art. Each component is represented as a collection of black horizontal runlengths with starting and end coordinates, this being one of the many representations of a connected component well-known in the prior art. Each has an associated data structure which serves to store features measured for each connected component. For each component, the following are computed. The first feature is the centroid also called the center of gravity and the central first moment. Calculation of the centroid is well-known in the prior art.

Figure 5:
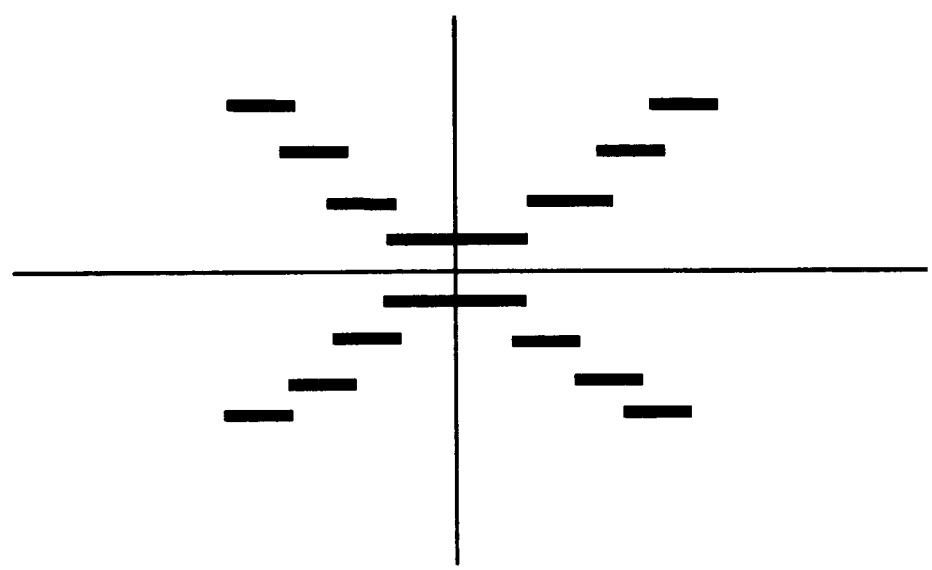
FIG. 5 shows a schematic of an 'X' marker on Cartesian axes. Vertical space has been added between the runlengths to make the runlengths distinct.
Figure 6:
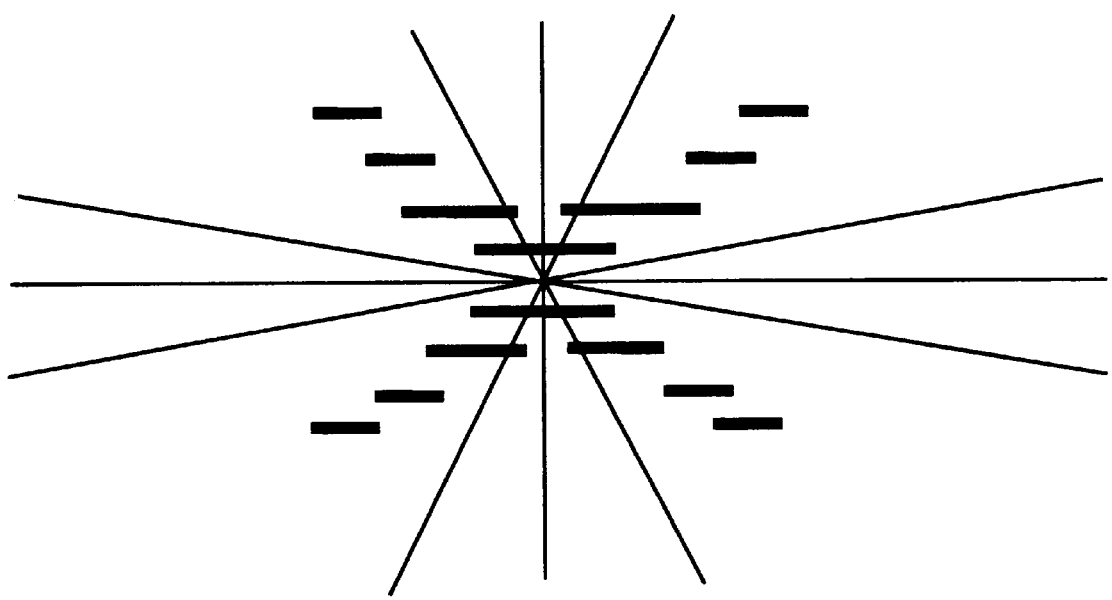
FIG. 6 shows a schematic of an 'X' marker on Cartesian axes showing lines delimiting the octants used in feature calculations.

From the centroid, the plane is divided into four quadrants as depicted in FIG. 5. For each quadrant, labeled ne, nw, se, and sw, a count is tallied of the number of runlengths completely contained within each quadrant. The average and sum of squared errors is computed, designated mean and variance, respectively. If the shape is an 'X', one would expect the mean to be less than but near 1.0 and the variance to be small.

Further, from the centroid, the plane is divided into octants. Using degrees measured counterclockwise, oct0= (345, 15], oct1 =(15, 75], oct2 =(75, 105], oct3 =(105, 165], oct4 =(165, 195], oct5 =(195, 255], oct6 =(255, 285], and oct7 =(285, 345]. For each octant, a tally is made of the number of horizontal runlengths that have midpoints in that octant. To increase detection accuracy, only runlengths with a midpoint a certain distance from the centroid are tallied. That distance, called the inner_threshold, is set to 0.025 times the smaller of the smaller of the component width and height. Each count is then divided by the total number of runlengths comprising the component. This normalizes the values to make them comparable for various image sampling resolutions. For a an 'X' marker, one would expect the counts in four of the octants to be high and four to be low. To this end, we count the number, above, of octants with counts greater than high oct_threshold=0.22 and the number, below, of octants with count below low oct_threshold =0.015.

The decision procedure as to whether a component is an 'X' marker is:
  if above=4, and
  if below=3, and
  component has at least 5 runs, and
  mean greater than 0.83, and,
  mean no greater than 1.0, and
  variance less than 0.004,
  declare the component to be an 'X' marker, and not otherwise.

If a component is found to be a marker, its centroid is returned. The above rules are found to accurately detect an 'X' shape in a variety of sizes, rotations and anisotropic distortions.

If exactly two markers are found in the list, their centroids are returned as marker positions. Otherwise the image undergoes a histogram equalization process, thresholded at T=64, the 8-connected components found and the classification procedure is executed again. In application, this second iteration is sufficient to handle any images encountered, although one could continue with different thresholds or image processing steps until two markers are found. Although the preferred embodiment finds exactly two markers, one or any number can be found by this method.

Once the marker positions are found, the calibration process, having the coordinates of various patches relative to the markers along with the captured image resolution, can find the patches on the image and register them to the known data for the patches on the test image original.

Figure 7:
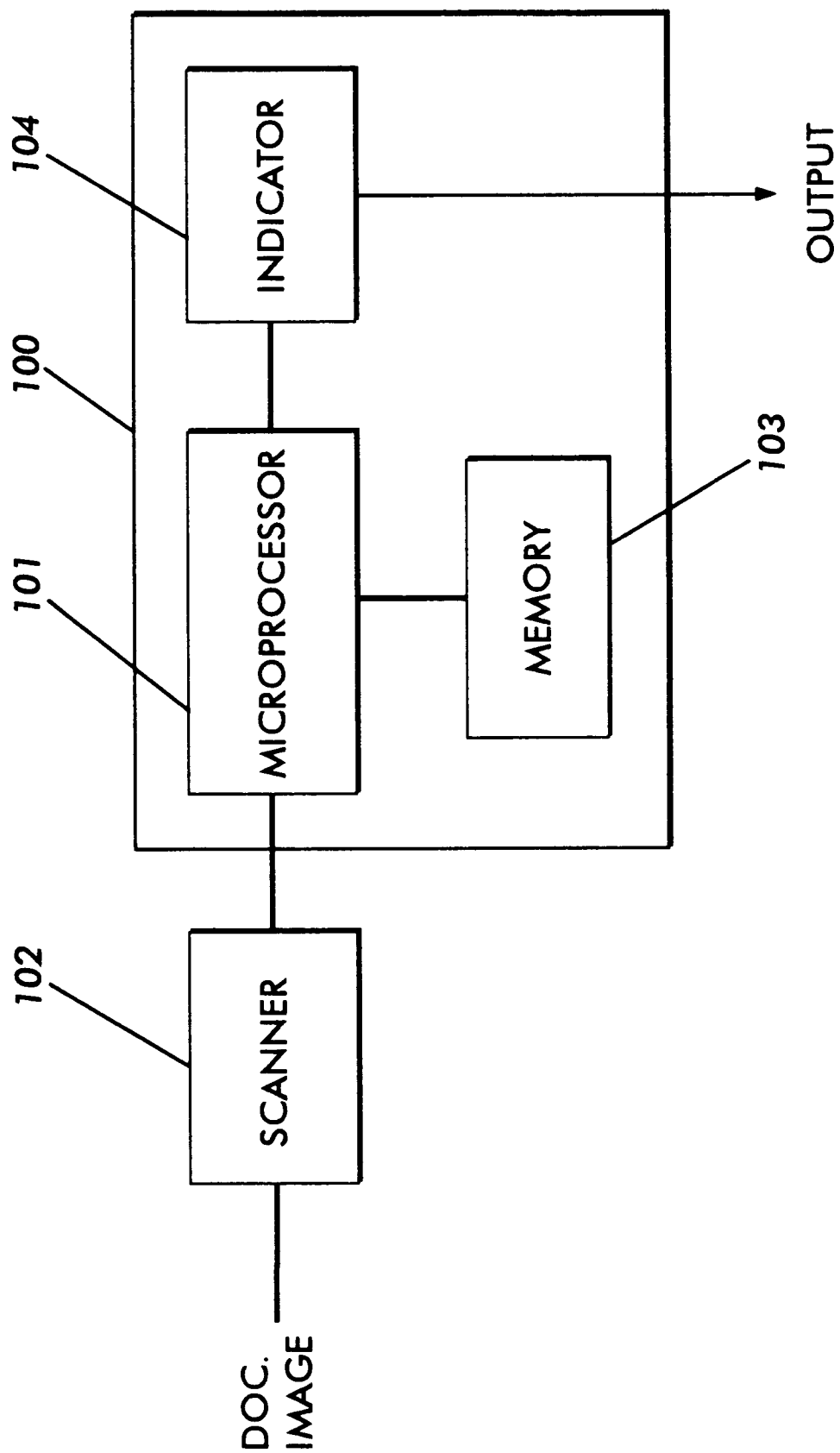
FIG. 7 illustrates the system that would be used to carry out the invention.

In accessing the image quality produced by an electronic scanning device using test targets containing special image patterns the scanned image data obtained from these "patches" are can be processed by a microprocessor using software to determine the scanner's modulation transfer function (MTF), pixel-to-pixel uniformity, tone reproduction curve (TRC) and random noise. Patch locations relative to special markers are known to the analysis software. In the typical system 100, as show in FIG. 7, that would be used for marker detection as disclosed herein, a scanning apparatus 102 would capture a document image that would include such markers. A microprocessor 101 would receive the document image and conduct the analysis given the software accessed from memory 103. Marker detection, or failure of detection would then be conveyed electronically to the user through signaling means 104 such as a CRT.

While the invention is described with reference to a particular embodiment, this particular embodiment is intended to be illustrative, not limiting. Various modifications may be made without departing from the spirit and scope of the invention as defined in the appended claims. Modifications and alterations will occur to others upon reading and understanding this specification; therefore, it is intended that all such modifications and alterations are included insofar as they come within the scope of the appended claims or equivalents thereof.

What is claimed is:

1. A method for detecting the presence and orientation of a predefined marker on a document comprising:
  capturing a document having at least one test marker;
  creating a feature vector with a plurality of elements that measures basic pattern and irregularity of said at least one test marker;
  determining said pattern by locating a majority of run lengths in predisposed orientations,
  determining irregularity by determining variance of a normalized number of runlengths in each quadrant for said pattern; and
  using pre-determined thresholds to determine if said pattern of said document meets a prototype definition for predefined markers.

2. The method of claim 1 wherein said test marker is determined a predefined marker if said pattern of said document meets said prototype definition for predefined markers.

3. The method of claim 1 wherein said predefined marker determination of said at least one test marker is performed by:
  inputting a linked list of connected components of a thresholded gray scale image for a desired marker; and
  setting a first pass threshold to a midlevel for a system.

4. The method of claim 3 wherein if markers matching said desired marker are not found at said midlevel threshold, said document image is histogram-equalized and reprocessed with a relatively low threshold.

5. The method of claim 1 wherein said predefined marker determination of said at least one test marker is performed by:
  histogram equalizing said document image;
  inputting a linked list of connected components of a thresholded gray scale image for a desired marker; and setting a first pass threshold to a relatively low level.

6. A noise insensitive method for locating and detecting a predefined marker on a document comprising:

capturing a document image having at least one marker;

identifying said at least one marker;

creating a feature vector with a plurality of elements that measure basic pattern and irregularity of said at least one marker;

determining said pattern by locating a majority of runlengths in predisposed orientations;

determining irregularity by determining variance of a normalized number of runlength in each quadrant for said pattern; and using pre-determined thresholds to determine if said pattern of said document meets a prototype definition for predefined markers.

7. The method of claim 6 wherein said predefined marker determination of said at least one test marker is performed by:

inputting a linked list of connected components of a thresholded 8-bit-per pixel gray scale image;

setting first pass threshold to a midlevel;

if markers are not found, said document image is histogram-equalized and reprocessed with a relatively low threshold.

8. The method of claim 7 wherein said predefined marker is an "X" and each connected component of said marker has the data associated with it including a list of its constituent black runlengths comprising a number of constituent runlengths (num), bounding box coordinates, a centroid (xbar, ybar), a number of midpoints of runlengths in each octant relative to said centroid normalized by said runlengths in said component (oct[0], . . ., oct[7]), and a number of black runlength completely contained in each quadrant relative to said centroid normalized by the height of each quadrant, wn, ne, sw and se.

9. The method of claim 8 wherein for each component, the average (mean) and sample variance (variance) of nw, ne, sw, and se is computed, said number of octants greater than 0.22 and less than 0.015 are tallied and a decision rule is used to reliably determine whether a connected component is an "X" or not if:

above equals 4, below is at least 3, num is at least 5, means is greater than 0.83, variance is less than 0.004.

10. The method of claim 9 wherein if said connected component cannot be determined to be an "X" and zero markers are identified, said image is equalized by histogram equalization and determination is repeated with a lower threshold of 64 and the average (mean) and sample variance (variance) of nw, ne, sw, and se is re-computed.

11. A noise insensitive method for locating and detecting a predefined marker on a document comprising a microprocessor programmed for:

capturing a document image having at least one marker;

identifying said at least one marker;

creating a feature vector with a plurality of elements that measure basic pattern and irregularity of said at least one marker;

determining said pattern by locating a majority of run lengths in predisposed orientations;

determining irregularity by determining variance of a normalized number of runlength in each quadrant for said pattern; and using pre-determined thresholds to determine if said pattern of said document meets a prototype definition for predefined.

12. The invention of claim 11 further comprising a memory for storing said prototype definition for predefined markers.

13. The invention of claim 12 further comprising an indicator means for indicating whether a marker is detected.

* * * * *